(No Model.)
G. W. PRICE.
NETTING MACHINE.
No. 495,266. Patented Apr. 11, 1893.
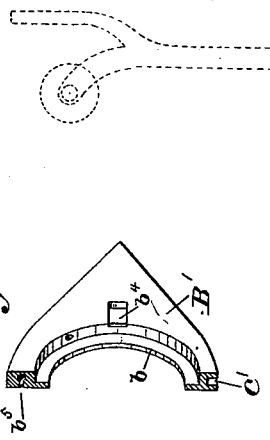
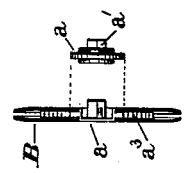
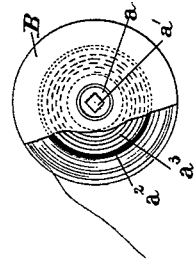
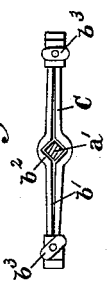
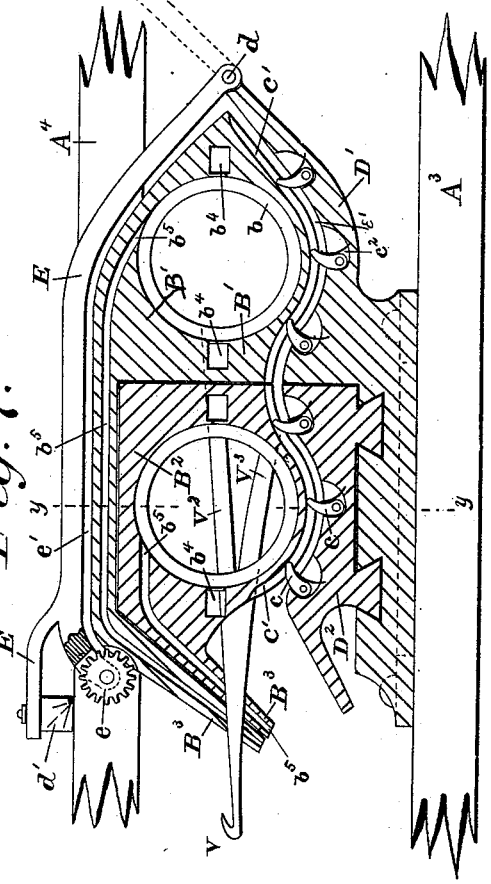
WITNESSES:
Edward A. Osse.
John E. Morris.
INVENTOR:
Geo. W. Price
By Chas B. Mann
Attorney.

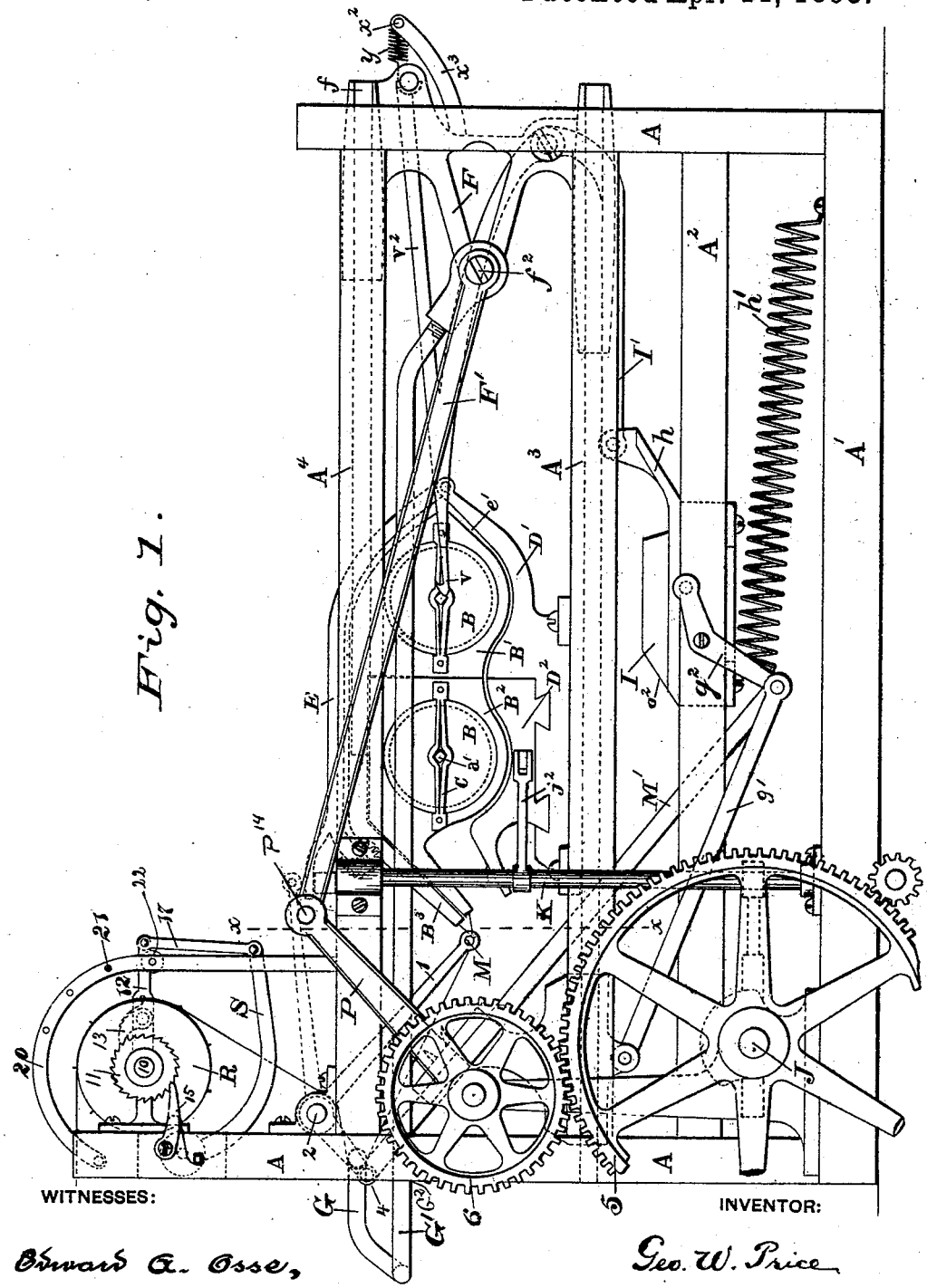

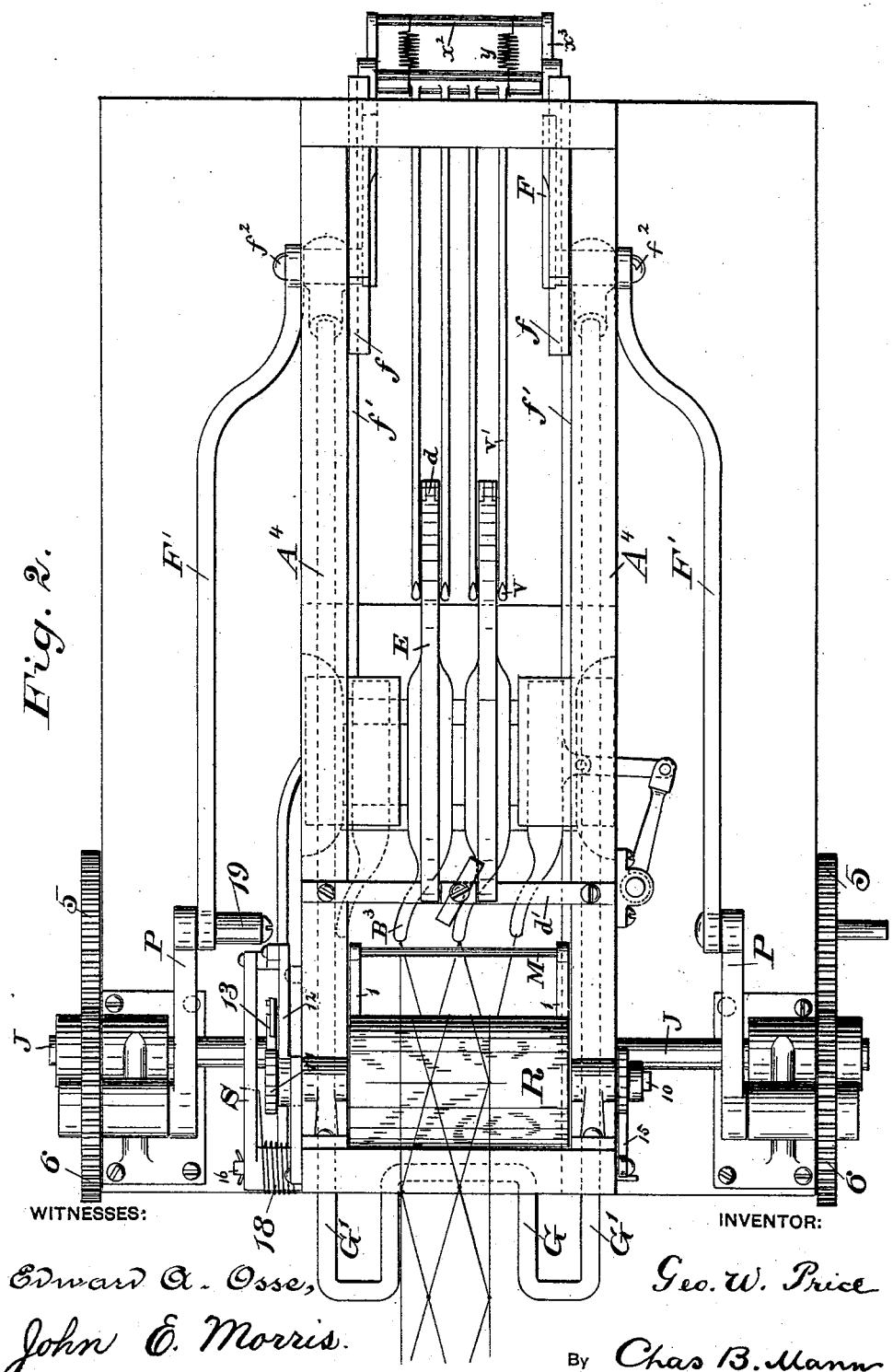

(No Model.) 9 Sheets—Sheet 4.
G. W. PRICE.
NETTING MACHINE.
No. 495,266. Patented Apr. 11, 1893.
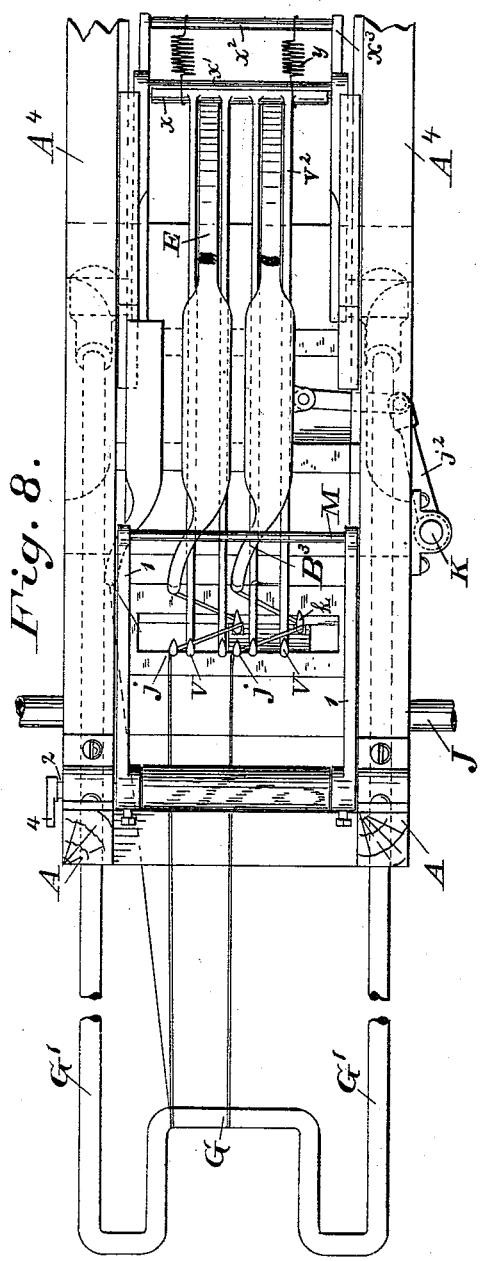
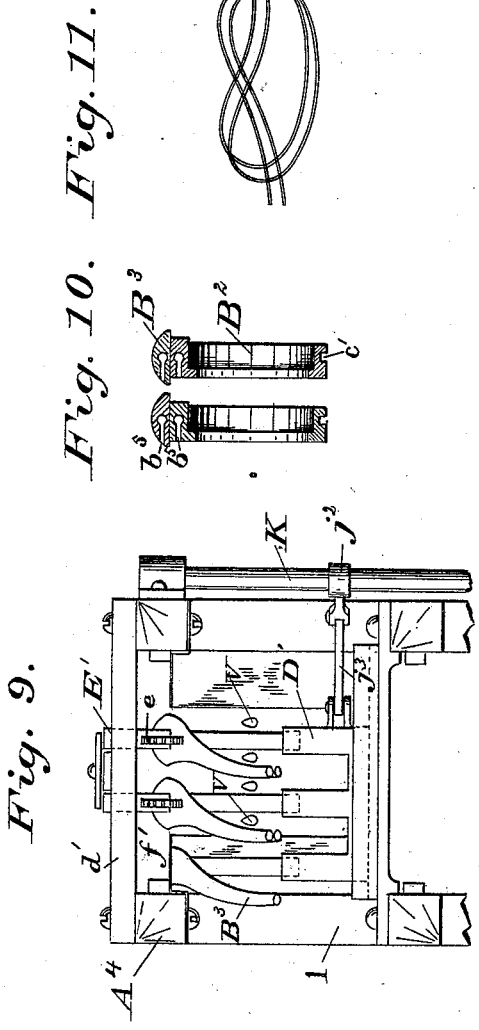
WITNESSES:
Edward A. Osse,
John E. Morris.
INVENTOR:
Geo. W. Price
By Chas B. Mann
Attorney.

(No Model.) 9 Sheets—Sheet 5.
G. W. PRICE.
NETTING MACHINE.
No. 495,266. Patented Apr. 11, 1893.
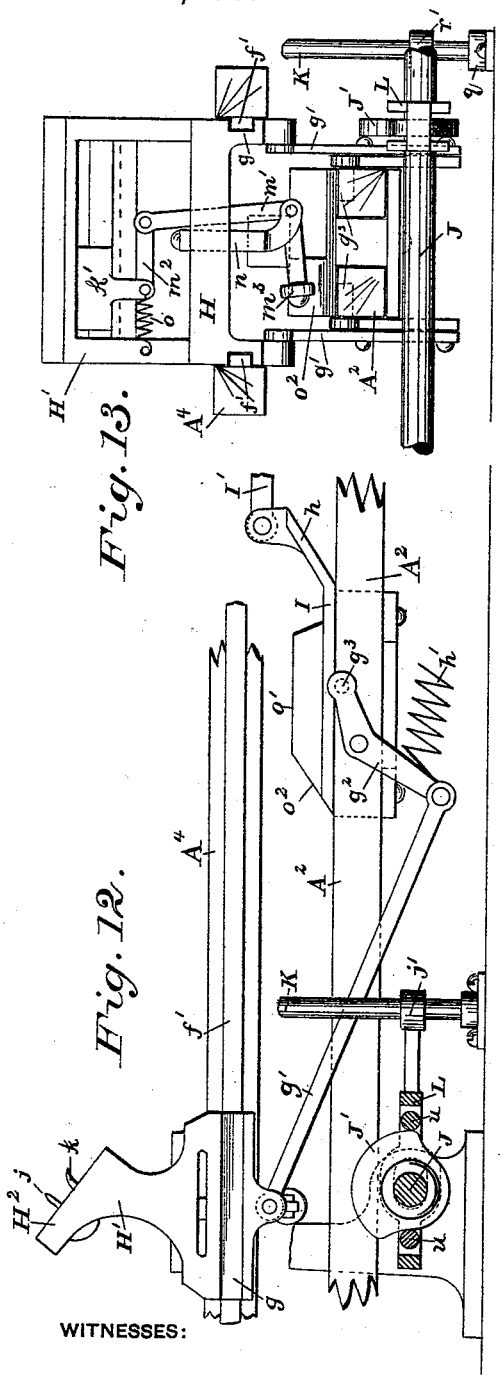
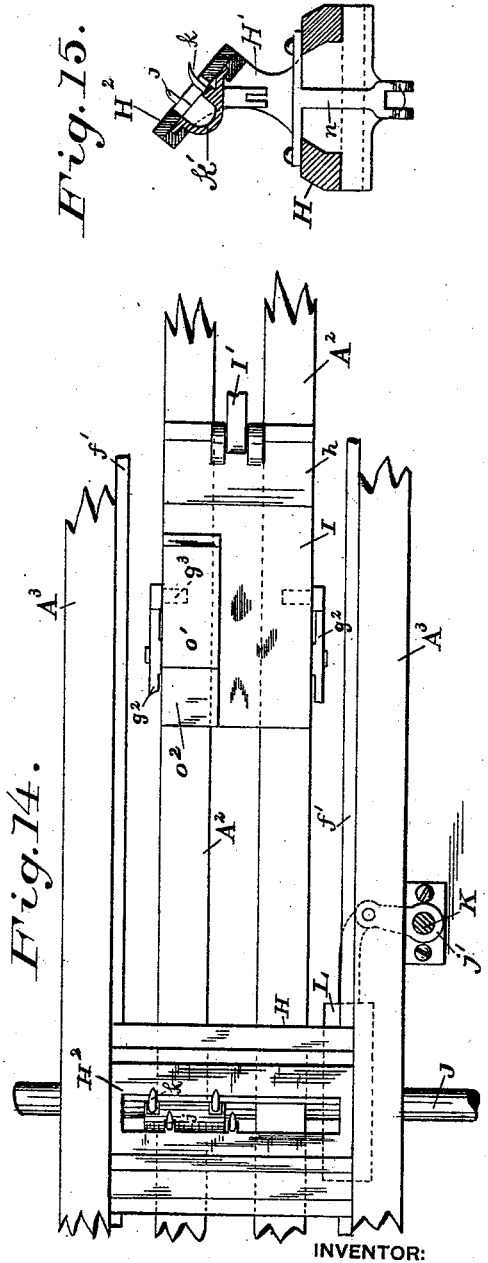
WITNESSES:
Edward A. Osse,
John E. Morris.
INVENTOR:
Geo. W. Price
By Chas B. Mann
Attorney.

(No Model.)

G. W. PRICE.
NETTING MACHINE.

No. 495,266. Patented Apr. 11, 1893.

WITNESSES:
Edward A. Osse,
John E. Morris.

INVENTOR:
Geo. W. Price
By Chas B. Mann
Attorney.

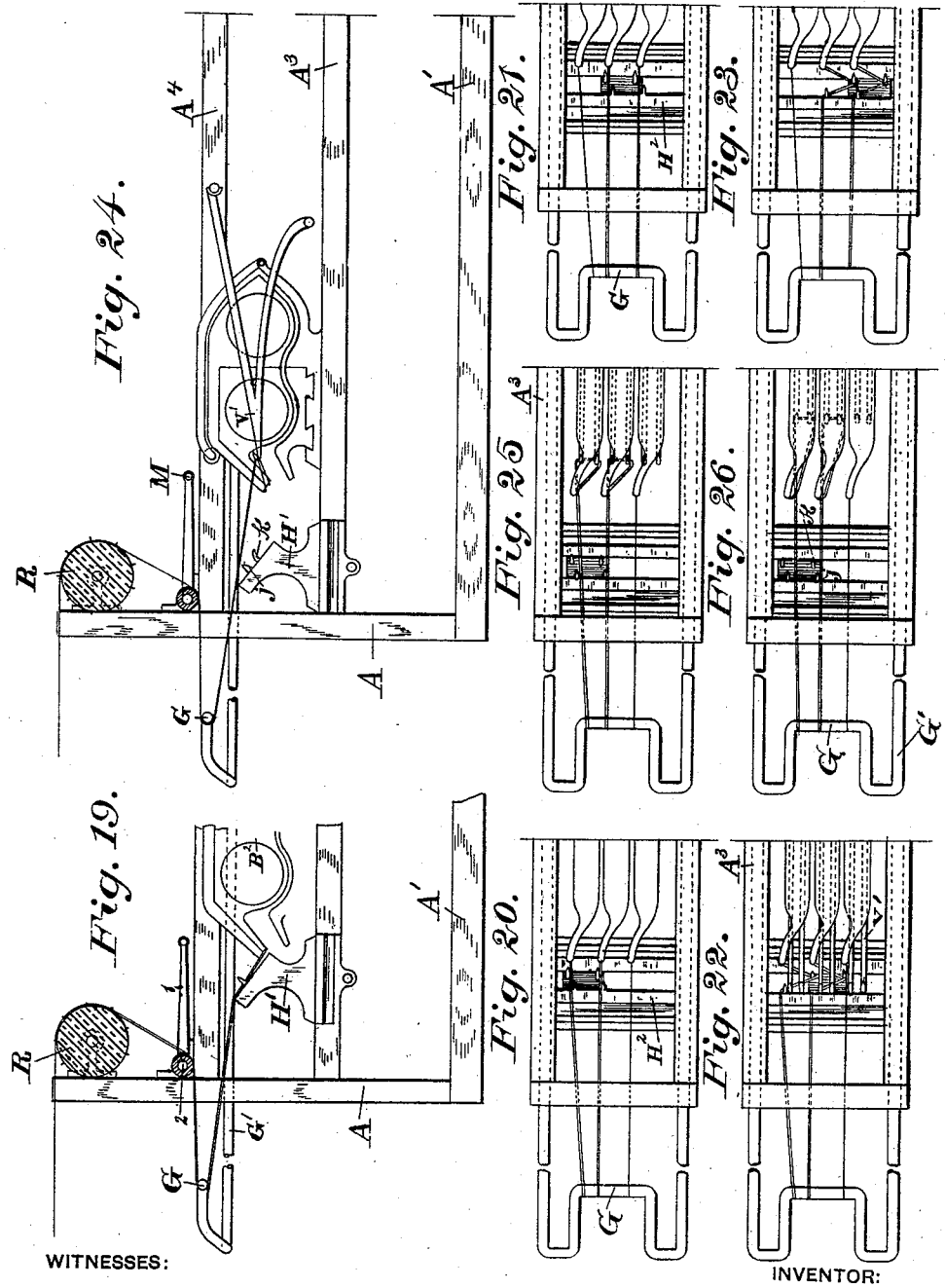

(No Model.) 9 Sheets—Sheet 8.
G. W. PRICE.
NETTING MACHINE.
No. 495,266. Patented Apr. 11, 1893.
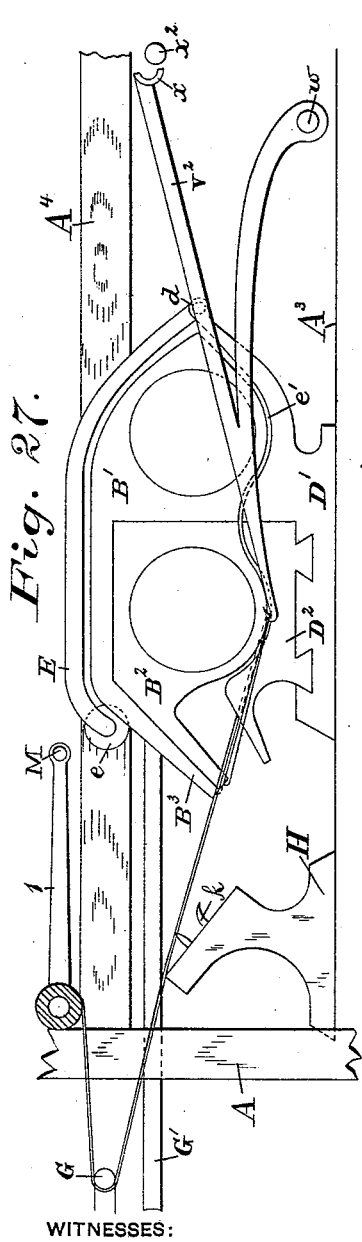
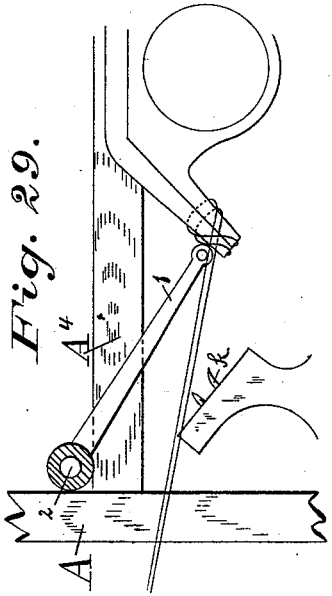
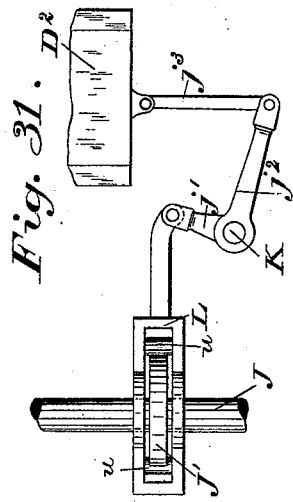
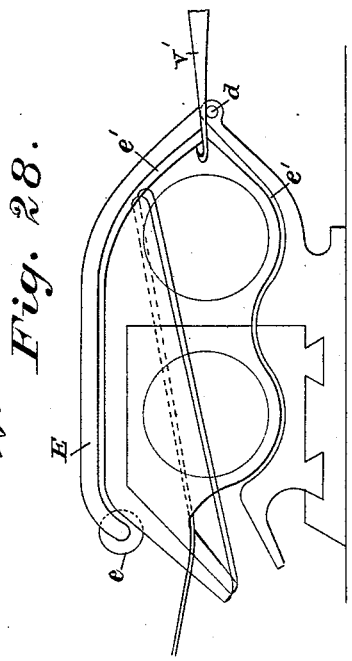
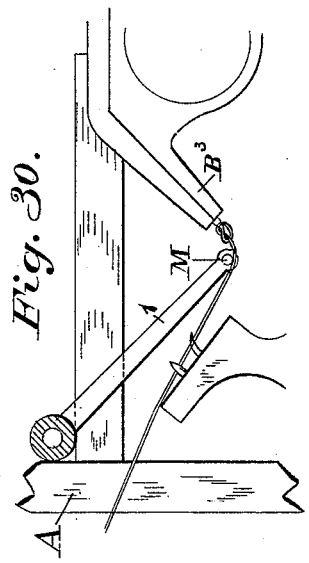
WITNESSES:
Edward A. Osse,
John E. Morris
INVENTOR:
Geo. W. Price
By Chas B. Mann
Attorney.

(No Model.) 9 Sheets—Sheet 9.
G. W. PRICE.
NETTING MACHINE.
No. 495,266. Patented Apr. 11, 1893.
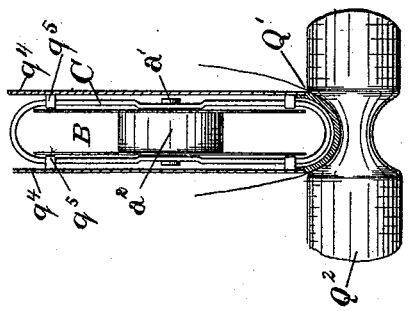
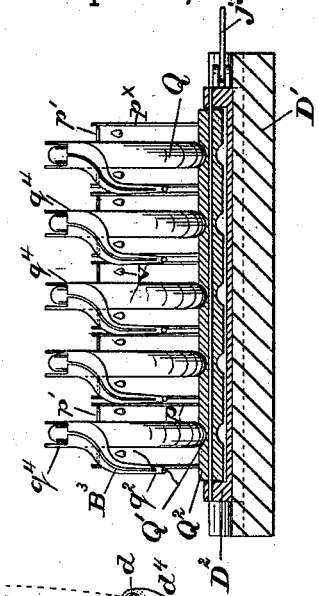
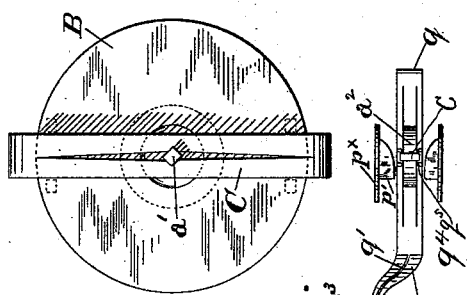
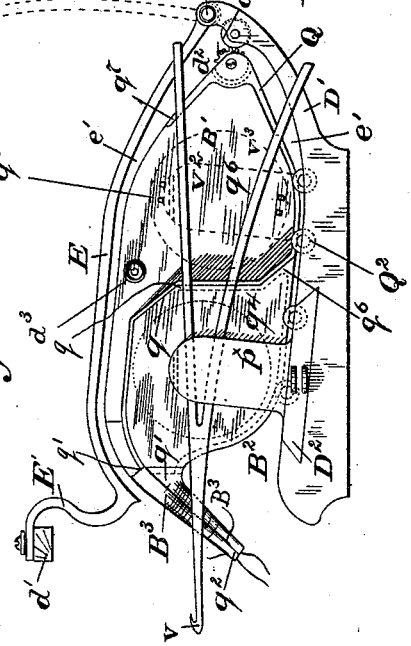
WITNESSES:
Edward A. Osse,
John E. Morris.
INVENTOR:
Geo. W. Price
By Chas B. Mann
Attorney.

UNITED STATES PATENT OFFICE.

GEORGE W. PRICE, OF BALTIMORE, MARYLAND.

NETTING-MACHINE.

SPECIFICATION forming part of Letters Patent No. 495,266, dated April 11, 1893.

Application filed January 30, 1885. Serial No. 154,392. (No model.)

*To all whom it may concern:*

Be it known that I, GEORGE W. PRICE, of the city of Baltimore and State of Maryland, have invented a new and Improved Netting-Machine, which consists of certain new and useful devices, combinations, movements, and arrangements of devices and parts, which will be more fully explained by reference to the following specification and accompanying drawings, of which—

Figure 16:
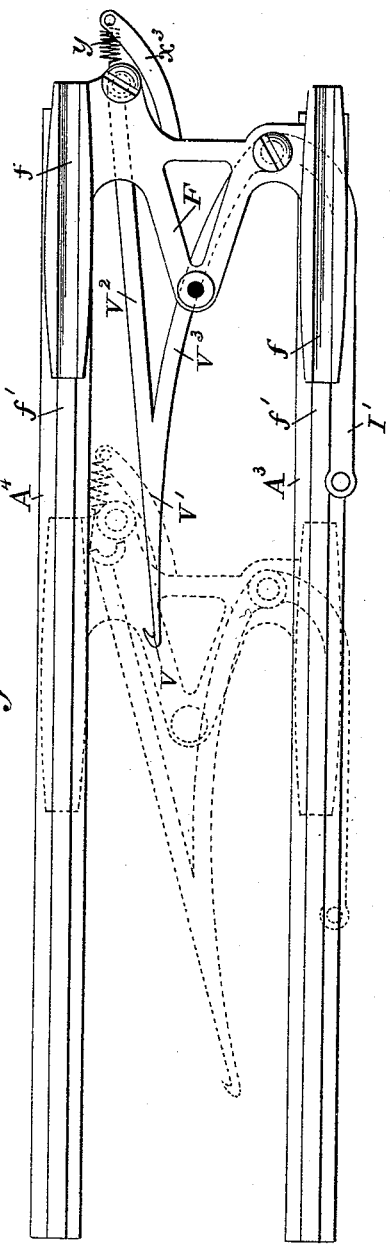
Figure 17:
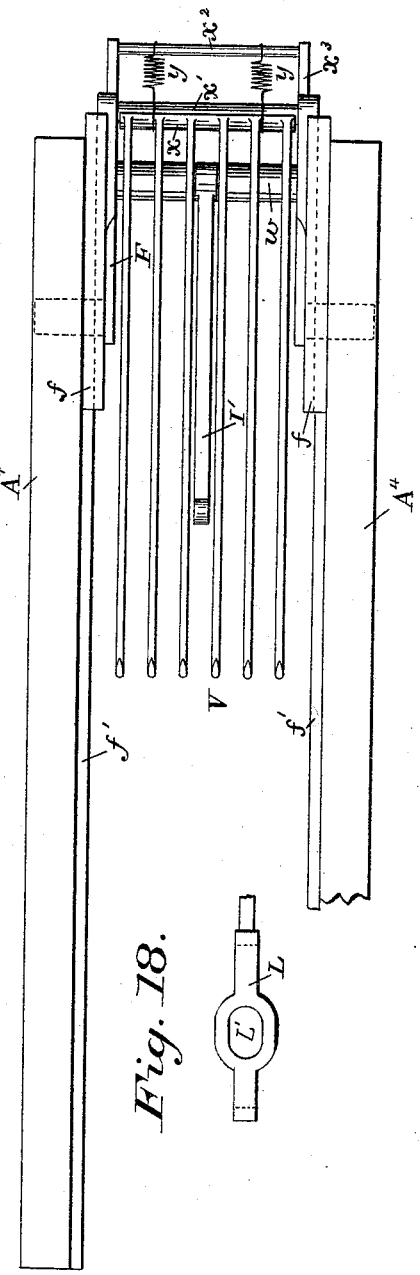
Figure 18:

Figure 1 is a side view of the machine, parts of which are broken away. Fig. 2 is a top view of the same. Fig. 3 is a view of one form of bobbin, one side partly broken away. Fig. 4 is a diametrical section of same. Fig. 5 is a section of one form of stationary bobbin holder. Fig. 6 is a view of one form of the spring or tension escapement. Fig. 7 is a sectional view of two bobbin holders, one stationary and one shifting. Fig. 8 is a top view of a part of the machine. Fig. 9 is a front view of part of the machine on the line X—X, Fig. 1. Fig. 10 is a vertical cross-section of the bobbin-holders showing some of the parts on line Y—Y, Fig. 7. Fig. 11 is a view of an open or loose knot formed of two threads, such as is formed by this machine. Fig. 12 is a sectional detail side view of certain parts, principally the loop-forming mechanism. Fig. 13 is an end view of the parts shown in Fig. 12. Fig. 14 is a top view of the loop-forming mechanism, being a plan of the parts shown in Fig. 12. Fig. 15 is a vertical section of part of the loop-forming mechanism. Figs. 16 and 17 are side and top views, respectively, of the series of hooks which draw back the loops. Fig. 18 is a side view of the yoke. Fig. 19 is a side view illustrating the first position of the loop-forming parts. Figs. 20 and 21 illustrate the first position of the bobbins before beginning the forming of a knot. In the one case the shifting bobbins are in the position in which the selvage thread from the extra shifting bobbin appears at the bottom of the figure; in the other case the shifting bobbins have moved so that the selvage thread from the extra bobbin appears at the top of the figure and on the other edge of the net. Figs. 22 and 23 show the second positions; Fig. 22 the second position of Fig. 20, and Fig. 23 the second position of Fig. 21. In these figures the hooks have caught the double threads and moved them to one side in position to be caught by the drawing-back hooks and carried behind the bobbins. Fig. 24 is a side view of the loop as partially drawn back by the hooks. Fig. 25 is a top view of the same. Figs. 26 and 27 are top and side views showing the loop drawn below the front bobbin holder. Fig. 28 is a side view showing the loop just after its release from the hooks. Fig. 29 is a side view showing the position of the loop as the depressing bar begins to depress the threads. Fig. 30 is a side view showing the position of the knot when tied. Fig. 31 is a top view of the mechanism for shifting the bobbins. Fig. 32 is a side view of another form of bobbin with its spring bar or tension escapement. Fig. 33 is a front sectional view of the box containing the bobbin shown in Fig. 32 and also showing the roller. Fig. 34 is a top view of the front bobbin holder and bobbin. Fig. 35 is a side view of the two bobbin holders, the rear one of which has one side plate removed. Fig. 36 is a front view of several bobbin-holders as they appear in the machine; the roller below being in section.

The devices for forming the net are mounted upon a suitable frame work, a convenient form of which is shown in the drawings in which the letter A designates the uprights and A', A², A³ and A⁴ the longitudinal horizontal bars of the frame. A main shaft J extending transversely of the machine with suitable power applied gives movement to the machine, and as shown and represented by the drawings, is provided with a spur wheel 5 meshing into another spur wheel 6, which is provided with the crank P. These wheels may be dispensed with and the crank attached to the main shaft J. The crank P is provided with a crank pin to which is attached one end of a connecting rod F' the other end of which is connected with a reciprocating carriage F by means of a stud $f^2$, which projects therefrom. The above description is illustrated fully in Fig. 1, and a similar arrangement of machinery is placed on the other side of the machine, as will be seen by reference to Fig. 2. The object of these parts and their arrangement is to give a reciprocating movement to a carriage F which moves back and forth in a longitudinal line with the frame-work of the machine, and which I will now describe. This carriage may be constructed in any suitable form so that it may be reciprocated. It should be made strong to support and carry the devices and attachments connected with it. A good form of construction of this carriage and attachments is the one shown on the right in Figs. 16 and 17, which illustrate a side view and top view respectively, and is designated by the letter F. As shown it is a simple frame in the longitudinal side bars of which I have provided a groove $f$, and have placed on the longitudinal side bars $A^3$ and $A^4$ of the machine, suitable slide rails $f'$, which enter the grooves $f$ in the reciprocating frame, and serve as guides and steadying devices for the carriage while working. Upon this reciprocating frame are mounted and to it are connected, the hooks and hook arms which move forward to catch the threads and draw them under the bobbins and bobbin-holders, the thread drawing device which draws out the thread from the bobbins, the studs $f^2$ which receive the ends of the pitman rods $F'$, the rod $I'$ which gives movement to the sliding cam which works the depressor for depressing the threads at the proper time, and also works the loop forming device and gives it a longitudinal forward movement in line with the movement of the reciprocating frame. As this sliding frame gives impulse to a number of the devices of the machine it would, perhaps, be well to notice the location of the various parts in the machine before proceeding to describe its details.

On the extreme right of the machine, as illustrated in Figs. 1, 2, 16 and 17, is shown the reciprocating frame above described; mounted upon it are the hook-arms $v'$ provided with the hooks V, directed one on each side of a bobbin and its holder; about the center of the machine are shown the bobbins B, one located in front of the other and suitably seated in their holders $B'$ and $B^2$: just in front of the forward bobbin, are shown the thread delivery beaks through which the thread passes as it comes from the bobbins. In front of these beaks and somewhat elevated above them, (Figs. 12 and 15) is shown the loop forming device $H'$ with its pins $j$ and $k$. Above this is shown the depressing bar M which is illustrated in Fig. 1, and a top view of the same is shown in Fig. 2. This bar comes down at the proper time and depresses the threads, when the loop-forming device has moved forward out of its way: at the end of the machine to the left is seen the thread drawer or bar G which is attached by means of its side rods $G'$ to the reciprocating carriage, and above, supported from the uprights A of the frame-work of the machine is shown the web-winding drum marked R in the drawings, the object of which is to carry off the net as it is formed. The thread which is wound around the bobbins when first seen issues from the ends of the thread delivery beaks, (see Figs. 19 to 24) then passes between a shifting pin $k$ and a stationary pin $j$ of the loop-forming device, thence it passes under and around the cross-bar G of the thread drawer, thence under and around the web-winding drum R and in its course may pass under or over the shaft 2 of the depressor M, and if under it, this shaft may be provided with a revolving friction sleeve S if desired, as shown in section in Figs. 27, 29, and 30.

By keeping in mind the location of the parts and course of the thread from the bobbins to the web-winder, the machine with its various movements and devices may be readily understood, and first I will describe

*The bobbins.*—As this machine has no spools, the bobbins in this invention take the place of the spools in ordinary machines, that is, they hold and give off the thread wound upon them, and are practically spool-bobbins. They are all alike, and are constructed to perform other movements and functions which will be understood by a description of one of them. Figs. 1, 3 and 4 illustrate a bobbin having a central shaft or spindle $a$, around which the bobbin turns, the side disks having central holes to receive the hub of the spindle $a$ as shown. Between the two disks which form the sides of the bobbin and connecting the same is a winding face $a^2$ upon which the thread is wound; within the chamber formed by the sides of the bobbin, the winding face $a^2$ and the shaft or spindle $a$, I have placed a coil spring $a^3$ one end of which is secured to the shaft $a$, and the other to the winding face so that the thread wound upon the winding face may, when drawn out, turn the bobbin around the shaft and wind up the coil spring $a^3$; the bobbin thus exerts a tension upon the thread, and in its reaction helps to tie the knot and rewinds the thread drawn out and not used in forming a half mesh of the net. The tension thus exerted upon the thread by the bobbin is maintained during the whole process of forming the knot in the thread and as the bobbin reacts and rewinds the thread when the loop is released from the hooks, it may be designated as an automatically reacting bobbin, or better, perhaps, a reacting tension bobbin. The above features of the bobbin, that is to say a bobbin which takes the place and performs the functions of a spool, exerts a tension upon the thread and reacts to rewind it and helps to tie the knot, I believe to be entirely new features in bobbins for netting machines. Immediately connected with this bobbin is another device which relieves the tension and allows more thread to be drawn when the bobbin and its spring are wound up by the drawing of the thread. The bobbins as practically used, are constructed so that a number of revolutions may be made before the coil spring is entirely wound up and they may be constructed so as to make a small net on the machine without using the relieving device, but in order to illustrate, let us suppose that when the thread drawing device is at the end of its outward stroke, the bobbin and spring are just wound up; the web-winder has wound up the half-mesh and the hooks have drawn back the loop and released it. The bobbins rewind all the thread drawn out, less the amount used in forming the half-mesh; the bobbin spring then is not entirely unwound when the thread drawer reaches the end of its inward stroke, so that when it begins again to draw out the thread, it begins with the coil spring of the bobbin partially wound. This spring will then become entirely wound up before the thread drawer again reaches the limit of its outward stroke and as any further drawing of the thread without a corresponding turning of the shaft or spindle $a$ would break it, there arises the necessity for providing some relief for the thread at this point. This I accomplish by a device which I have called a tension relief or a tension escapement, one form of which may be described as follows: Upon the end of the shaft or spindle $a$, I construct a square or polygonal arbor $a'$ (see Figs. 3, 4, and 6). This arbor has its bearing in a bar $b^2$ containing an opening of a similar shape for the reception of the arbor $a'$. This bar is marked C on the drawings. It is made of metal or other suitable material and is either formed (as shown in Fig. 6) of two pieces joined together at their ends and held by set-screws $b^3$ or one piece (Fig. 1) split in two throughout its length except a short space at its extremities, thus practically forming springs which hold and keep the shaft from turning and which are regulated to resist a strain somewhat stronger than that resisted by the spring in the bobbin, but not strong enough to break the thread before yielding. The ends of this bar are suitably secured to any part of the apparatus, taking care not to interfere with the passage of the loop around the bobbin-holders; as shown in Fig. 1, this bar is secured at each end to a part of the bobbin-holder by means of rivets or studs which are riveted into the bobbin-holder beyond the circumference of the bobbin. The action of this device is very simple. When the thread is drawn out of the device until the coil spring is wound up and more thread is still required, the two sides of the bar open and allow the shaft $a$ to turn without breaking the thread until the required amount is drawn out. As this action occurs while the coil spring is wound up, the bobbin has the benefit of the full recoil of that spring, so that, when the thread drawer has returned to the limit of its stroke it begins to draw out the thread with the bobbin coil spring entirely unwound, just as it started at first. I have, therefore, called the device a tension relief, compensator, or escapement. The action of this device as combined with the automatic bobbin, I believe to be entirely new in netting machines.

*The bobbin holder.*—Its construction, action and function I will now explain. In netting machines ordinarily, the thread loops are conducted around the bobbin and between it and the bobbin holder, a passage way for this purpose being usually provided. In my machine I pass the loop around a passage way outside of the holders; by this arrangement I am enabled to have an unobstructed passage for the loops, and it enables me to use a turning or revolving bobbin in the holder, which in no way interferes with the passage of the thread. Although the bobbins are all alike in construction, it requires the thread issuing from two of them to form the knot. It is also requisite that when a knot is tied in two strands of thread the next knot must be tied with one of those strands and one of the strands next adjoining it. It is apparent, therefore, that some provision must be made to shift one of the strands to the next adjoining one. For this reason I have arranged the bobbins and their holders one in front of and in line with the other, and have divided them into two series, one a stationary series and the other a movable or shifting series. In the drawings, I have illustrated the forward bobbins and bobbin-holders as the shifting series, and have placed the stationary series behind, and in line with them. It is evident, however, that these positions may be reversed if desired that is to say, those behind may be made to shift while those in front remain stationary, and the same result will follow.

The position of the shifting and stationary bobbins and bobbin-holders, one in front of and in line with the other, presents the best form of which I have any knowledge, as they take up little room, enable me to make a large knot on a small machine, and provide room for the hooks to pass.

The construction of the bobbin holders is very simple. (A sectional view of one form of them is shown in Fig. 7.) They are marked B' and B². They hold and support the bobbin: those illustrated by Fig. 7 are constructed to conform to the circular shape of the bobbin. These holders are provided with thread delivery beaks B³, and the beaks are hollow with a passage or opening $b^5$, extending from the beak back through the bobbin-holder to the bobbin. Through these passages the threads from the wound bobbins are passed (see Fig. 7). It will be seen by reference to this figure that the beak of the bobbin-holder in the rear extends over and beyond the one in front. The object of this is that the threads as they issue from the beaks may run in line with each other, and be used together in forming the loop and making the knot. The delivery beaks have also another angle of projection, that is, to the side or laterally. This feature is shown clearly in Figs. 2, 8, 9 and 20.

The object of projecting the beaks laterally is to enable the hook V located on that side of the bobbin corresponding with the lateral projection of the beak to pass between the end of the beak and the side of the bobbin, in order that the thread may be crossed as it is drawn back around the bobbin, and so form a knot when drawn together. This feature I will explain more fully when I explain the loop forming device and the hooks which draw the loop around the bobbin which perform their functions in the machine in time to agree with the movements of each other and with the thread drawer. A bed plate D' suitably attached to the frame of the machine, supports the rear bobbin holders and also supports a carriage or sliding frame $D^2$, which is suitably seated in grooves in the bed plate D', so that it may slide across and back and carry with it the shifting bobbins and holders as one thread is moved in line with the next adjoining one. Between the bobbin-holders and their supports, a channel $e'$ is left for the passage of the thread when drawn back by the hooks. Upon these supports I have placed the pivoted fingers $c$ whose upper ends enter a groove $c'$ in the bottom of the bobbin-holders, and serve as a seat for the holders at the same time to prevent any side movement thereof. The fingers $c$ are provided with springs $c^2$ to keep them in position which yield to the pressure of the threads as the loop is drawn back and allow it to pass, and running sidewise with the carriage $D^2$, carry the movable bobbin-holders with them. A confining-bar E secures each stationary bobbin-holder in position. One end of this confining bar is pivoted at $d$ to the bed plate D', and from this point it extends over the holders and beaks and the other end I have for convenience provided with a spur wheel $e$ which enters a groove in the front of the forward delivery beak $B^3$. The confining-bar thus placed gives room for the passage of the loop between it and the holder, and prevents any movement of the holder greater than the space between it and the confining-bar. The free end of each confining-bar has a fork or projection E' which rests on a cross-bar $d'$ and is secured thereto.
The bar as thus secured leaves a thread-loop space $e'$ between its lower surface and the upper surface of the bobbin holders. Thus it will be seen that a continuous passage for the thread-loop is provided entirely around the bobbin-holders and their beaks; the bed-plate D', sliding seat $D^2$, and confining-bar E, by their form and construction prevent any movement of the bobbin-holders in longitudinal directions more than is necessary for a free passage of the thread-loop around them, while the turning of the wheel $e$ allows the thread to pass easily.

Another way of constructing and arranging the bobbin with bobbin-holders is illustrated in Figs. 32 to 36. Fig. 32 is a side view of a bobbin with its spring retaining bar C, and Fig. 33 is a front or edge view of the same, a sectional view of the casing, and a fragment of the roller beneath, showing the winding face $a^2$ upon which the thread is wound. Interiorly the bobbin is constructed with the coil-spring $a^3$; as already described; the shaft $a$ and arbor $a'$ are shown in the drawings; the spring retaining bar C runs around the bobbin which is suspended between its two sides, thus practically placing a retaining bar on each side and uniting them at the ends. The bobbin-holder consists of a stiff piece of metal Q rounded on its lower edge at Q', (Figs. 33 and 36) to conform to the shape of the groove of the roller or rollers $Q^2$. In the front holder this metal extends around to the point $q$ and on the other side to the point $q'$, so that between $q$ and $q'$ the metal is open, the opening being sufficiently large to admit the bobbin between the two points. Upon this metal is brazed or otherwise secured, the delivery beak $B^3$. The beak is opened at the top throughout its length except a small space at the end as shown at $q^2$ (Figs. 34, 35 and 36); this is provided for the purpose of facilitating the threading of the strands. The upper and forward surface of this beak is flat so as to make a good rest for the beak of the bobbin in the rear, which is correspondingly flattened on its under surface and which serves as a partial guide to the forward bobbin-holders as they slide in, carrying one thead to the next adjoining one. This flattened surface of the forward bobbin beak is marked in the drawings $q^3$ (Fig. 34): a piece of tin or other thin metal $q^4$ suitably secured to the sides of the stiff metal Q forms a box into which the bobbin is dropped. The front bobbin in Fig. 35 shows the sheet metal and the dotted circle gives the figure of the bobbin behind it. The rear bobbin-holder in the same figure illustrates the holder with one side removed. Upon each side of these thin sheets, at the top and bottom, I have placed the lugs or projections $q^5$ which are far enough apart to allow the retaining bar to pass, without extending out far enough to touch the bobbin. It will be seen that when the bobbin and its retaining bar are dropped within the box, these projections keep it securely in position while the bobbin may revolve freely. The rear bobbin-holder is constructed practically in the same way, though the stiff metal Q to which the thin sheets forming the sides of the box are attached has a different shape; it begins at $q'$ and runs along over the top of the box which contains the front bobbin, then down; at the bottom it goes off at an angle marked $q^6$, so as to leave no point or projection upon which the loops may catch as it passes, running around in the course shown in Fig. 35 it terminates at the point $q^7$ so as to admit of an easy insertion and taking out of the bobbin. At the point $d^2$, I have placed a small wheel which may or may not be provided with teeth so formed as to receive the thread of the loop between them without cutting it, and between the two sides of the box, I have placed the roller $d^3$ which serves the double purpose of stiffening the case and guiding the thread from the bobbin to its delivery beak: upon the end of the holder the delivery beak $B^3$ is attached. The bobbins are placed in their respective holders when ready to be put in place. Upon a base D' inclining toward the rear of the machine I have placed a series of rollers $Q^2$ upon which the bobbin-holders are seated so as to be elevated above the base far enough to leave a passage way for the loop. The base D has a groove crosswise of the machine, within which is placed the slide $D^2$, which carries the rollers under the forward bobbin-holders. Upon this slide a piece of thin metal $p^x$ is secured which stands perpendicular thereto, and one is located on each side of a bobbin. The upper end of these pieces is provided with a projection $p'$, high enough to allow the loop-hooks V to pass below it and between the thin metal piece and the bobbins. These projections extend toward the bobbin-casing and close to it so as to prevent lateral movement of the bobbin and holder, and allow the loop to pass; the bar E pivoted at $d$ is secured at its other end as before described. It will be seen by this arrangement of bobbin and bobbin-holder that the inclined surface upon which they rest will always tend to keep the two wheels $d^2$, $d^4$ in contact, limiting the movement of the bobbin-holders in the backward direction, and the retaining-bar E limits their movement in an upward direction, while the front delivery beak and conforming shape of the stiff metal Q of the rear bobbin-holders keep the two bobbin-holders together and enable me to provide a free and unobstructed passage-way for the thread loop above the bobbin-holders and to dispense with the spur wheel $e$ shown in Fig. 7.

*The loop forming device.*—In all netting machines in which a loop is passed around a bobbin some arrangement or mechanism must be devised to form the loop in proper shape so that when drawn around the bobbin the loop thus formed may, when properly drawn together, form a knot. It is also necessary when the loop is thus formed that some provision be made to pass it around the bobbins. The loop-forming device in this machine has several movements. At present I will explain those movements only, which form the loop and prepare it for the hooks. Upon a suitably mounted support H' (see Figs. 12, 15, 19 and 24) I have arranged a series of stationary and a series of movable pins; looking across the machine they appear in parallel lines. The shifting pins as arranged are below the stationary pins. The stationary pins are marked $j$ in the drawings, and the shifting pins are marked $k$. The lower or shifting pins as shown, are slightly bent forward or curved for the purpose of allowing the loops to be easily pulled off by the loop hooks. As the action of all of these pins in forming the loop in the thread is the same, it may be understood by a description of one pair of them, that is one stationary and one shifting pin. Figs. 19 to 30 show the threads issuing from the delivery beaks and passing between a shifting and stationary pin, to and about the thread-drawer and thence to the web-winder, upon which thread a proper tension is maintained by the tension bobbin. While in this position the shifting pins $k$ move to one side, carrying the threads with it as shown in Fig. 8. These threads are thus formed in the shape of a V, one side of which runs from the delivery beaks to the shifting pin $k$ and the other side from the shifting pin $k$ to the stationary pin $j$ in line with the delivery beaks of the threads. Now as the shifting pins $k$ are located upon the inclined plane lower than the stationary pins $j$, by referring to Fig. 8 it will be seen that the threads are so placed that the hooks V may pass over or above that part of the strands which run from the delivery beaks to the shifting pin $k$ and under that part of the strands with which the hooks engage and which extends from the shifting to the stationary pin. Fig. 8 shows clearly the position of the strands as they are first caught by the hooks. These pins $k$ may be shifted by any mechanism for the purpose, a good one, however, is that shown in the drawings. A base H carries a support H' having an inclined plate $H^2$ (Figs. 12, 15, 19 and 24), the support H' being hollowed out and slotted so as to allow a block $k'$ to be placed within and slide back and forth; upon this block are placed the shifting pins which project through the slot. Upon the inclined plate $H^2$ upon the face of the support and above the movable pins are secured the fixed pins $j$. Pin bar or block $k'$ is actuated by a right angled lever $m'$ (Fig. 13) pivoted to a hanger $n$ on the base H. The upper arm of the lever $m'$ is connected by a link $m^2$ with the pin bar $k'$. A raised surface $o'$ on the reciprocating cam I has an incline $o^2$ at one end which moves against the friction roller $m^3$ on lever $m'$, which rides up on this raised surface $o'$ thus tilting the lever $m'$ and sliding the pin bar $k'$, carrying the pins $k$ to the position shown in Fig. 8. A spring $o$ draws the movable pin-bar back to its original position when released by the movement of the cam.

Leaving the threads in the position shown in Fig. 8, I will now describe the loop-hooks V and their arms V'. Figs. 16 and 17 may be used for this description. Each hook-arm V' has two branches $V^2$ and $V^3$. All the lower branches $V^3$ are pivoted on a cross-bar or shaft $w$ which connects the lower part of the two sides of the reciprocating carriage F. The ends of all the upper branches $V^2$ are connected together by a cross-bar $x$. A bracket $x^3$ suitably attached to the frame-work of the reciprocating carriage projects from one side, and a corresponding one is located on the other side connected by the bar $x^2$, as shown in the figures. To this bar $x^2$ is attached the springs $y$, the other ends of the springs being secured to the bar $x$ and holding the branches $V^2$ in contact with the cross-bar $x'$. As thus constructed the hook-arms V' with their hooks V, have their normal position with the hooks, one on each side of the bobbins and their holders, with the hooks pointed in line with the upper pins $j$ of the loop-forming device, so that when they enter the same they may touch the lower side of the strands with which they engage, slightly raising them up in passing, the strands dropping back immediately behind the hooks so as to be caught by them when they return. Returning now to Fig. 8, I will explain the action of these hooks as they draw the loop under and around the bobbin. As the hooks move back toward the rear of the machine, the first position of the thread-loop appears as shown in Figs. 24 and 25 which represent the top and side views. It will be seen that the lines of the thread are properly crossed: those leading from the thread delivery beaks running under and across the strands which extend from the hook to the thread drawing bar G. It will also be seen that both hooks are on the same side of the thread delivery beaks, one of which is between the beak and the side of the bobbin next to it, and the other on the other side of the bobbin. Now if the loop thus formed be passed around the bobbin the effect would be the same as if the ends of the thread in the beaks were passed through the loop, and were thus to form a knot. While the loop and hooks are in the position shown in Figs. 24 and 25, it will also be seen that the line of the strands which run from the end of the hooks to the thread drawing-bar G, has been elevated sufficiently to allow the shifting pins $k$ of the loop-forming device to return to their original positions without touching the thread. About this time cam I has released the bar $k'$ and the spring $o$ throws this bar, carrying the pins $k$ back to their places. It would be well to mention here that the thread drawer recedes as the hooks go back, while the tension bobbins keep the threads in place by exerting and maintaining a constant tension upon them. As the hooks with the loops recede the loops strike against the front part of the bobbin-holders, and as the hooks still continue to pull back the curved contour of these bobbin-holders direct and guide the loop downwardly so that the loops may pass underneath them. As the loops are thus drawn down the springs $y$ yield, allowing the hooks and their arms V' to be depressed the loop passing the roller $Q^2$ or finger $c$ in its passage under the bobbin holder, until it arrives at the position shown in Figs. 26 and 27. Continuing its passage, the loop passes the extreme end of the bobbin-holder in the rear when the hooks begin to return. In returning the loop strikes against the edge of the bobbin-holder as shown in Fig. 28, and as the hooks continue to move forward the loop is released from the hooks. At this point a slack in the thread occurs which is taken up instantly by the reaction of the bobbins, which draws up the strand, closing the knot, and would tie it perhaps around the delivery beak as shown in Fig. 29, were it not for the depressing bar M which comes down at the proper time, depresses the threads, pulls the loops from the beaks and the knot is tied just below them. This is illustrated in Fig. 30.

I will now describe the depressing device. Upon the two uprights A of the frame-work of the machine the shaft 2 is supported in suitable bearings and extends across from one side to the other. (See Figs. 1 and 8.) To this shaft are attached, so as to respond to the rocking thereof, the two arms 1; an arm or crank 4 is attached at one end to the shaft 2, and is connected at the other end with the rod M' which receives its motion from one of the levers $g^2$, the cross-bar M joining the outer ends of the two arms 1 together. It is this bar M which comes in contact with the strands of thread and depresses them to pull down the knot at the proper time. The movement of the levers $g^2$ is effected by a reciprocating cam I which slides on the two bars $A^2$ running longitudinally as to the machine. This cam is connected with the reciprocating carriage F by the rod I'. The two levers $g^2$ have short projections $g^3$ directed inwardly and are located at the upper ends of the levers as indicated by broken lines Figs. 13 and 14, and a broken line circle $g^3$ in Fig. 12. These projections $g^3$ are arranged when depressed to pass below the upper surface of the bars $A^2$. A convenient provision for this may be made by cutting out the bars sufficiently to allow the cam to pass over these projections without interruption, and hold them in place while passing. The cam I has an upward inclined surface $h$, which strikes against the projections $g^3$ and forces them down as it moves backwardly. The two levers $g^2$ at their lower ends are joined by a cross-bar, to which cross-bar is attached the spring $h'$. As the projections are released by the cam, this spring draws the levers in the opposite direction. It will be seen that the depressing bar M as it comes down would strike against the loop-forming device if that device were allowed to stand in the position shown in Fig. 19. I have, therefore, availed myself of the cam I, spring $h'$, levers $g^2$, and links $g'$ to move the loop-forming device forward and out of the way of the depressing bar as it descends. This loop-forming device H' is seated upon a suitable frame or base H which is properly grooved in its sides at $g$. These grooves work upon the slide rails $f'$ which are extended forward beyond the point reached by the reciprocating carriage F. The ends of the levers $g^2$ are joined by the rods $g'$ to the base H of the loop forming device. Thus it will be seen that the depressor and loop-former are moved by the same mechanism, and as they work together the loop-former moves forward out of the way as the depressing bar descends and returns to its place in front of the thread delivery beaks as the depressing bar goes up, each in its turn getting out of the way of the other.

I will now describe what I have called the web-roller. All netting machines have web-rollers; that is, some device for carrying off the net as it is formed. In this machine the web-rolling device consists of a winding drum R mounted on a shaft 10 which has its bearings attached to a suitable part of the uprights A of the frame of the machine. A ratchet wheel 11 is fixed on the drum shaft and an arm 12 has one end pivoted on the shaft so that its other end may be worked. This end carries a pawl 13 which engages with the ratchet wheel 11; the upward movement of this arm turns the drum and winds up the net. At the other end of the shaft 10 another ratchet wheel is provided, and a pawl 15 pivoted to a suitable part of the framework and provided with a spring prevents any back movement of the drum. The arm 12 is worked by the following mechanism: A curved lever S, one end of which is pivoted to the frame at 16, and has the other or free end, joined by a link or rod 17 to the pawl arm 12. A spring 18 exerts a tension upon the arm S and gives it its downward movement, keeping it down until moved upwardly. Upon one of the cranks P the wrist pin projects and is provided with a friction roller 19. As this crank turns, the friction roller 19 on the wrist pin, strikes against the lower edge of the curved arm S and raises it, thereby partly turning the drum. The intermittent rotary motion thus imparted to the drum occurs just after the knot is tied, and winds upon the drum a portion of the net. The length of the twine thus wound up gages the distance at which the next knot is tied, and thus the meshes are formed of regular size. There is also a provision in the mechanism by which the sizes of these meshes may be changed and made of any size required. This provision consists of the following parts: A curved bracket 20 is secured to a suitable part of the frame of the machine, and arranged so that the curved part will be concentric with the swing of the lever 12. In this bracket I have placed the pin holes 21. Through one of these holes a pin 22 is inserted, upon which the lever 12 is allowed to rest. The lower one of these holes gives the largest mesh. When it is desired to have the mesh smaller, the pin is taken out and inserted in one of the holes above, according to the size mesh required. Thus it will be seen that as the crank pin roller 19 will not begin to move the lever 12 until it has reached the distance of the lever S from the first hole, the throw of the lever 12 will be shorter, a smaller portion of the net will be wound upon the drum and the size of mesh reduced correspondingly.

The thread drawing device is attached to the reciprocating carriage and reciprocates with it. As shown in the drawings it is formed of two horizontal rods or bars G' located on opposite sides of the carriage and parallel with each other. The ends of the rods attached to the carriage are for convenience, secured to the studs $f^2$, placed there for that purpose. These rods are guided in suitable bearings, located at any convenient part of the frame of the machine. As shown in the drawings they are guided in a hole $G^2$ through one of the uprights A of the machine on each side. The ends of these rods are joined by a cross-bar running at right angles with the rods and marked on the drawings with the letter G. Each strand of thread which issues from the beaks first passes between a shifting and a stationary pin of the loop-forming device, then around the cross-bar G and thence under and around the shaft of the depressing device to the web-winder as shown in Fig. 19.

I have now described all of the features of the machine and the manner in which they operate in forming a knot. The machine would continue in this way tying the same strands of twine together: it is therefore necessary after one pair of strands are tied that one of those strands should be tied with one strand of the next adjoining pair. I have, therefore, provided a means for accomplishing this purpose. I have already described the bobbins as being located in line with each other so that the strands issuing from their beaks run out and are tied together. One of these bobbins and its holder is stationary and the other is seated upon its cross-wise sliding frame $D^2$. Now when a knot is tied in a pair of stands thus prepared, it is only necessary to move the sliding frame $D^2$ across the machine until the thread delivery beak of a bobbin-holder comes directly in line with the beak of the next adjoining stationary bobbin-holder, and proceed to tie a knot in the two strands proceeding therefrom. When this is done the same bobbin-holders are brought back to their original places and a knot is again tied in the two original strands, thus alternating from one to the other. In this way a net-work is formed as illustrated in Figs. 2 and 8.

A convenient form of mechanism for working the sliding-frame $D^2$ is illustrated in Fig. 31. Upon the shaft J, I have placed the cam J' which works in the slotted bracket or yoke L. This yoke is also slotted sidewise (L', Fig. 18) to permit a back and forth movement without interruption from the shaft J. Within the vertical slot of this yoke I have placed the rollers $v$ upon which the cam works. The rock shaft K is provided with two arms, one arm of which, $j'$, is connected with the yoke L, and the other arm $j^2$ is connected with the sliding frame $D^2$ by the rod or link $j^3$, thus movement is given to the sliding seat $D^2$ which carries the bobbin holder and thread to the next adjoining strand and back again in proper time to its original place.

The operation of the machine is as follows: The bobbins are first wound with the threads intended to form the knot; they are then placed in their respective holders and the threads brought through the delivery beaks. The holders are then put into their seats and the retaining bar E brought down and properly secured. The threads are then carried over the loop-forming device as already described; then passed under and around the thread drawing bar G and then under the depressor shaft and around the web-winder. The machine is now ready to begin work; power is applied, the main shaft turns, the reciprocating frame moves forward carrying with it the hooks and hook-arms and also the thread drawer which draws out the threads and winds up the springs in the bobbins. The loop-forming device approaches toward the thread delivery beaks, as the depressing bar ascends; the loop forming device stops in front of the delivery beaks, the pins k catch the threads and form them into loops in time to receive the hooks as they pass forward; the hooks catch the thread and begin to recede, the thread drawer beginning its backward movement at the same time. The hooks pull off the loops from the pins of the loop-forming device, giving room for the pins k to assume their original position, and the hooks continue to draw the loop under and around the bobbin-holders until they reach the limit of their backward stroke and the loops have passed the extreme end of the bobbin-holders. During this process the bobbins exert and maintain a tension upon the strands of thread preventing them from slacking or tangling or falling off the pins or hooks until the hooks begin to return and the loops coming in contact with the edge of the bobbin-holders are thus released from the hook. The bobbins now perform another duty. They at once draw up the slack, tie the knot and rewind the unwound thread. During this operation the loop-forming device has moved forward, the depressing bar has descended, pulling the knot down until it is drawn tight by the reacting bobbin just below the ends of the thread delivery beaks. Now the web-roller gives a turn, the distance of which has been previously regulated as already described, the threads from the shifting bobbin-holders are carried over and are placed in line with the threads of the next adjoining stationary bobbin-holder, the machine gives another revolution and ties a knot in the alternate strands until a net of the required size is completed. In order that there may be selvage edge alike on both sides, I construct the machine so there may be one stationary bobbin less than the shifting bobbins. If during the operation of the machine the bobbin spring becomes entirely wound up so that no more thread can be drawn without breaking, the tension escapement acts by releasing the shaft allowing it to turn and so permit the thread to be drawn out.

It will be seen from the foregoing description that the result of making a net is accomplished by certain movements of parts simultaneous and consecutive, co-acting and co-operating, until the knots are tied and the net is made. It will also be seen that many of these movements may be effected by other mechanisms which any mechanic might substitute for the forms shown. For example, any other means for shifting the bobbins from side to side would do equally as well as those shown in the drawings, or for moving the pins in the loop-former, or for moving the loop-former out of the way of the depressor or for raising and lowering the depressor, &c. So too, while the reciprocating carriage is a convenient form of device from which many of the impulses are given, the threads may be drawn and the hooks may be propelled backward and forward by any of the means and mechanisms commonly employed by mechanisms for procuring reciprocating motion.

What I claim, and desire to secure by Letters Patent, is—

1. In a netting machine a reacting or rewinding tension bobbin, in combination with a thread drawing device as set forth.

2. In a netting machine a reacting or rewinding tension bobbin in combination with a loop-forming device.

3. In a netting machine, a reacting or rewinding tension bobbin, in combination with a thread drawing device and a loop-forming device.

4. In a netting machine, a reacting or rewinding tension bobbin and bobbin-holder in combination with a thread drawing device, a loop forming device and two loop hooks arranged to reciprocate one on each side of the bobbins and holders as set forth.

5. In a netting machine, a reacting or rewinding bobbin in combination with a pair of loop hooks co-operating to release the loop, rewind the unused thread and tie the knot, substantially as described.

6. In a netting machine, a reacting tension bobbin consisting of the following parts—two side plates connected by an interior winding-face, a central hub around which the plates turn, and a coil spring connecting the winding-face and central hub as set forth.

7. A tension bobbin having a shaft in combination with a tension escapement to release said shaft and allow it to turn when the bobbin has reached the limit of its turning movement, as set forth.

8. A tension releasing device consisting of two spring bars substantially as shown, in combination with a bobbin having a shaft resting between said bars as set forth.

9. A bobbin-holder consisting of a box to receive the bobbin provided with the lugs or projections to hold the bobbin in position as set forth.

10. In a netting machine a series of bobbin-holders resting upon a seat having the upright pieces with the projections p' in combination with the bobbins seated within the holder, substantially as shown.

11. The retaining bar E pivoted at one end and secured at the other so as to provide a passage-way between said bar and the bobbin-holders, in combination with the bobbin-holders and the seat D' upon which the holders rest, substantially as described.

12. A pair of bobbins and bobbin-holders arranged in the same plane with one another, in combination with a seat upon which they rest, substantially as described.

13. A pair of bobbins and bobbin-holders in the same plane, the rear bobbin-holder having a thread delivery beak which projects over and rests upon the beak of the front bobbin-holder, substantially as set forth.

14. A series of bobbins and bobbin-holders arranged in pairs in the same plane, in combination with a series of loop-hooks to reciprocate between the bobbins and holders, substantially as described.

15. In a netting machine a pair of bobbins and a holder for each bobbin provided with a thread delivery beak inclined to one side in combination with two reciprocating loop-hooks, one of which is arranged to reciprocate along side of the holders and between them and their beaks as set forth.

16. In a netting machine the combination of a series of loop hooks for the purpose described, with means for reciprocating said hooks and allowing them to yield to conform to the course of the loop being formed thereby, substantially as described.

17. In a netting machine the combination of a reacting or rewinding tension bobbin, a tension releasing device, and a thread drawing device.

18. In a netting machine a series of reacting or rewinding tension bobbins in combination with a series of loop-hooks reciprocating between them, a loop-forming device, a thread drawing device, and a web-winder, as set forth.

19. In a netting machine a series of shifting bobbins and bobbin-holders, in combination with a series of stationary bobbins and bobbin-holders, each series having thread delivery beaks, and mechanism for moving the shifting bobbins with their delivery beaks to and in line with the next adjoining stationary bobbin beaks and back again to their original places, substantially as shown and described.

20. In a netting machine a mesh gaging device consisting of the following parts—the curved bracket 20 provided with the pin holes 21, in combination with the lever 12 resting upon the pin and arranged to be shifted from one hole to another, substantially as described.

In testimony whereof I affix my signature in presence of two witnesses.

GEORGE W. PRICE.

Witnesses:
WM. B. NELSON,
JOHN E. MORRIS.